United States Patent
Masui et al.

(10) Patent No.: US 7,483,360 B2
(45) Date of Patent: Jan. 27, 2009

(54) OPTICAL PICKUP DEVICE USING POLARIZING HOLOGRAM ELEMENT AND HOLOGRAM LASER THEREFOR

(75) Inventors: Katsushige Masui, Nara (JP); Kazuhiro Tsuchida, Kashihara (JP); Kazunori Matsubara, Nara (JP); Masahiro Ikehara, Nara (JP); Keiji Sakai, Nara (JP); Tetsuo Ueyama, Nara (JP); Toshiya Nagahama, Kashiba (JP)

(73) Assignee: Sharp Kabushiki Kaisha, Osaka (JP)

( * ) Notice: Subject to any disclaimer, the term of this patent is extended or adjusted under 35 U.S.C. 154(b) by 666 days.

(21) Appl. No.: 10/954,923

(22) Filed: Sep. 29, 2004

(65) Prior Publication Data
US 2005/0100061 A1  May 12, 2005

(30) Foreign Application Priority Data
Sep. 30, 2003  (JP)  ............................. P2003-340872

(51) Int. Cl.
*G11B 7/00* (2006.01)
(52) U.S. Cl. .................................. 369/120; 369/112.03
(58) Field of Classification Search ........................ None
See application file for complete search history.

(56) References Cited

U.S. PATENT DOCUMENTS

| 5,532,999 | A | * | 7/1996 | Aikoh et al. ................. 369/120 |
| 5,608,695 | A | | 3/1997 | Yamazaki |
| 5,881,035 | A | | 3/1999 | Ueyama |
| 5,953,295 | A | * | 9/1999 | Nagano ..................... 369/44.23 |
| 6,392,965 | B1 | | 5/2002 | Ueyama |
| 6,542,447 | B1 | * | 4/2003 | Matsuo et al. ............. 369/44.23 |
| 6,563,099 | B2 | * | 5/2003 | Kimura et al. ............. 250/201.5 |
| 6,597,642 | B1 | * | 7/2003 | Ijima et al. ................. 369/44.11 |
| 6,873,589 | B2 | * | 3/2005 | Nakao ..................... 369/112.03 |
| 2002/0018433 | A1 | * | 2/2002 | Ohuchida ............. 369/112.07 |

FOREIGN PATENT DOCUMENTS

| JP | 6-195742 | 7/1994 |
| JP | 7-129980 | 5/1995 |
| JP | 9-161282 | 6/1997 |
| JP | 2000-057592 | 2/2000 |
| JP | 2001-250250 | 9/2001 |
| JP | 2002-342956 | 11/2002 |

* cited by examiner

*Primary Examiner*—Joseph Feild
(74) *Attorney, Agent, or Firm*—Morrison & Foerster LLP

(57) ABSTRACT

To read information from a target information recording surface reliably by canceling DC offsets in tracking-signal detection signals is provided. In effecting tracking servo by 3-beam method, auxiliary light receiving domains $D3\_1$, $D3\_2$, $D8\_1$, $D8\_2$ are provided. The auxiliary light receiving domain receives images formed by the light returned from a different information recording surface from the one targeted for reading. Sub beams of ± first-order diffracted light enter the light receiving domains D3, D8, D1, D10. With respect to the diffraction direction of the hologram, the auxiliary light receiving domains $D3\_1$, $D3\_2$ ($D8\_1$, $D8\_2$) are provided on both sides of the light receiving domain D3 (D8). Since signals are computed as: $D8-(D8\_1+D8\_2)$; and $D3-(D3\_1+D3\_2)$ with the internal connection, DC offsets can be canceled in RES signals (D1+D3, D8+D10) used in the DPP method.

16 Claims, 17 Drawing Sheets

FIG. 12A

+ 1ST ORDER SIDE     − 1ST ORDER SIDE

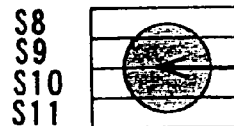
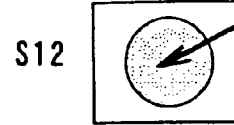
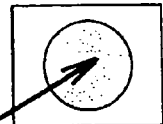
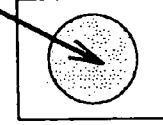

HOLOGRAM ELEMENT 70

TRACK DIRECTION ↑

```
FES(SPOT SIZE)=(S3+S4)-(S2+S5)-(S9+S10)+(S8+S11)
RF=S2+S3+S4+S5+S8+S9+S10+S11
RES(3Beam)=(S1+S7)-(S6+S12)
```

FIG. 12B

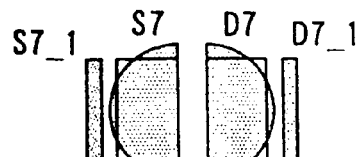
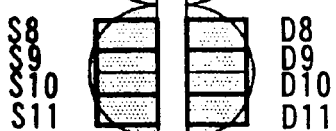
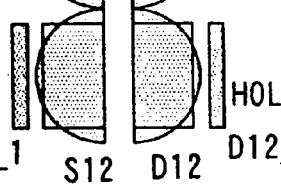
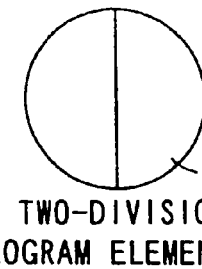
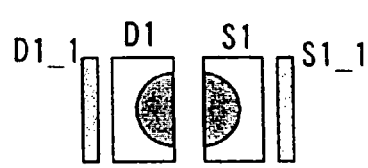
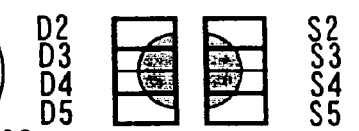
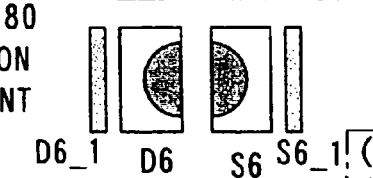

80 TWO-DIVISION HOLOGRAM ELEMENT

TRACK DIRECTION ↑

```
FES(SPOT SIZE)=(D3+S3+D4+S4)-(D2+S2+D5+S5)
              -(D9+S9+D10+S10)+(D8+S8+D11+S11)
RF=D2+S2+D3+S3+D4+S4+D5+S5
   +D8+S8+D9+S9+D10+S10+D11+S11
RES(MPP)=(D2+D3+D4+D5+D8+D9+D10+D11)
         -(S2+S3+S4+S5+S8+S9+S10+S11)
RES(SPP)=(D1+D6+D7+D12)-(S1+S6+S7+S11)
RES(DPP)=MPP-K*DPP
```

```
(D1-D1_1)
(S1-S1_1)
(D6-D6_1)
(S6-S6_1)
(D7-D7_1)
(S7-S7_1)
(D12-D12_1)
(S12-S12_1)
: ELECTRICALLY
  CONNECTED
```

PHASE SHIFT SIGNAL

OPTICAL PICKUP DEVICE USING POLARIZING HOLOGRAM ELEMENT AND HOLOGRAM LASER THEREFOR

CROSS-REFERENCE TO RELATED APPLICATIONS

This application claims priority to Japanese Patent Application No. 2003-340872, filed on Sep. 30, 2003, the contents of which are incorporated herein by reference in their entirety.

BACKGROUND OF THE INVENTION

1. Field of the Invention

The present invention relates to an optical pickup and a hologram laser designed for use in reading and writing of signals in optical disks such as CD, CD-R/RW, DVD, and DVD±R/RW, and more particularly to an optical pickup and a hologram laser that are suitable for reading out information recorded in an optical disk having a plurality of information recording surfaces.

2. Description of the Related Art

Conventionally, an optical disk called "CD family disk" has been used in which reading and writing of signals are performed with use of a semiconductor laser device having an emission wavelength of 780 nm as a light source. In the case of the CD family disk, tracking servo control is generally exercised by means of the so-called 3-beam method with which a diffraction grating is required.

And also, in recent years, an optical disk called "DVD family disk", which is capable of recording larger quantities of information, has been coming into wider and wider use. In the DVD family disk, a red-color semiconductor laser device having an emission wavelength of 630 to 690 nm is employed as a light source for reading and writing signals. In the case of the DVD family disk, tracking servo control is exercised by means of the Differential Phase Detection method (DPD method). Moreover, in order to increase information recording capacity, an optical disk having a plurality of information recording surfaces is employed. In this case, there occurs a phenomenon in which reflection light comes from other information recording surfaces than a given information recording surface kept in an information-reading state. In order to cope with the resultant reflection light, certain countermeasures must be taken (for example, refer to Japanese Unexamined Patent Publications JP-A 7-129980 and JP-A 9-161282).

In addition to that, CD-R and CD-RW (hereafter referred to as "CD-R/RW" on the whole), DVD-R, DVD-RW, DVD+R, and DVD+RW (hereafter referred to as "DVD±R/RW" on the whole) have been used as information recording media. These recordable optical disks are each provided with guide grooves running along the information recording track. Since the guide groove is not a simple groove, but is configured as a wobbled groove, tracking servo control is exercised by means of the PP method. In this case, however, a DC offset may be caused in a PP signal due to a tilting of the disk, which results in the recording accuracy being deteriorated. In order to cancel the DC offset, the Differential Push Pull method (DPP method: a diffraction grating is required) is adopted. Since, in particular, an optical pickup designed for a DVD family optical disk is required to deal also with reading operations on a CD family disk, even if the DPP method using three light beams is adopted, there is no need to increase the number of optical elements.

FIG. 13 is a view schematically showing the structure of an optical pickup of standard design. The optical pickup 1 includes a hologram laser 2, a collimator lens 3, a raising mirror 4, and an objective lens 5. The optical pickup 1 serves to read out recorded information from an information recording surface 7 of an optical disk 6, and to perform information recording. The hologram laser 2 is designed as a single unit composed of a combination of a semiconductor laser chip acting as a laser light source; a photodiode acting as a signal-detection light receiving element; a hologram for deflecting light returned from the optical disk 6 to the light receiving element; and a diffraction grating for splitting laser light into three light beams.

FIG. 14 is a view of one conventional example, illustrating a hologram 8 pattern of a hologram element, a configuration of a light receiving domain in a light receiving portion of a light receiving element 9 corresponding to the hologram pattern, and a method for reading out a signal. Also shown in FIG. 14 is the plane-wise positional relationship between the hologram 8 and the light receiving element 9. The plane is perpendicular to the optical axis. Further shown in FIG. 14 are patterns of light transmitted through or diffracted at the hologram 8 pattern, as observed on the light receiving domain. Since the light receiving element 9 is located farther away from the hologram 8 than the focal point, the laser light pattern observed on the light receiving domain dose not coincide with the hologram 8 pattern. By contrast, if the light receiving element 9 is located closer to the hologram 8 than the focal point, the laser light is proportional in pattern to the hologram 8.

In the conventional example such as shown herein, the knife-edge method is applied to focusing control, and the DPP method is applied to tracking control. In order to apply the knife-edge method to focusing control, a difference in output signal between the domains D5 and D6 is obtained by using half of a main beam. D4 and D7 are provided to cancel a DC offset which is caused to a focusing control signal by the light reflected from a different information recording surface from the one kept in an information-reading state (for example, refer to Japanese Unexamined Patent Publications JP-A 9-161282 and JP-A 2000-57592).

As shown in FIG. 14, the hologram 8 is divided into three regions by a straight line running in a direction parallel to a direction equivalent to the track direction of the optical disk and another straight line running in a direction perpendicular to the direction equivalent to the track direction, thereby constituting a three-division hologram. Note that "the direction equivalent to the track direction" refers to a direction in which, for example, three light beams lined up in the track direction on the optical disk 6 as shown in FIG. 13 are rearranged in an array on the hologram 8 after being converged through the objective lens 5 and the collimator lens 3 or reflected from the raising mirror 4.

Hereafter, the DPP method will be described in detail with reference to FIGS. 15 through 17. As is widely known, on the information recording surface 7 of the optical disk 6 are arranged information-bearing pits in the track direction. The light converged on the pit is reflected from and simultaneously diffracted at the pit. Of the light from the pit, the undiffracted light component is allowed to pass through the objective lens 5, whereas the diffracted light component is partly rejected at the objective lens 5. The overlapping portion between the diffracted and undiffracted light components appears to brighten and darken due to interference effects, so that bright and dark portions are created as shown in FIG. 15. Then, the main beam is split into two beam components by a center line running in the track direction, and a difference in signal between the beam components is obtained to generate an MPP signal (Main Push Pull signal) In this way, it will be found that no signal difference is observed when the main beam is present right above the track. By exploiting this fact, it is possible to control the light converged through the objective lens 5 to be located above the track at all times. That is, tracking control can be achieved properly.

In regard to a sub beam, by obtaining an SPP signal (Sub Push Pull signal), namely, a difference between a light beam of + first order and a light beam of − first order, a push pull signal can be generated. Moreover, by obtaining a DPP signal, namely, a difference between MPP and SPP signals, a tracking control signal of higher accuracy can be generated. As shown in FIG. 17A, in terms of the circuit, an SPP signal of lower intensity is amplified by K times relative to an MPP signal to make its intensity coincide with the intensity of the MPP signal. Thereby, as shown in FIG. 17B, a DPP signal can be generated. In a 3-beam-generating diffraction grating 10 which is used in the way as shown in FIG. 16A, phase shift regions are secured for the purpose of facilitating adjustment of the position of the sub beam (the position with respect to the track) (for details, refer to Japanese Unexamined Patent Publication JP-A 2001-250250, for example).

Since pit information is included in every main beam, as shown in FIG. 14, the signals outputted from all the light receiving domains on which the main beam is incident are summed up (D2+D9+(D4+D5+D6+D7)) to obtain an RF signal (information signal). This makes it possible to maximize the signal intensity.

As described heretofore, the DPP method is necessary to achieve reading and writing on a disk for recording purposes. However, in this case, the following problem is raised. For example, when a double-layer disk having a plurality of information recording surfaces 7 is subjected to information reading operations, a signal from the information recording surface kept in a non-reading state finds its way into a tracking signal-detection SPP signal as a DC offset. In general, in the case of reading out information from a single-layer information recording surface with a push pull signal such as a focusing error signal, by changing the distance between the objective lens 5 and the information recording surface 7, an S-shaped curve is obtained, and the signal is converged to zero at the focused focal point. Meanwhile, in the double-layer disk, when the light returned from the other information recording surface than the one kept in an information-reading state is also received simultaneously, due to the influence of the return light, the signal fails to converge to zero at the focused focal point. This leads to occurrence of a DC offset.

In an attempt to prevent occurrence of an offset, JP-A 7-129980 and JP-A 9-161282 proposed the following techniques. According to the former, an HOE (Hologram Optical Element) is employed in which a plurality of light receiving domains are arranged substantially perpendicularly to the track direction so as to cause astigmatic aberration in diffracted light. In this case, the spot center on the photo detector can be prevented from deviating from the dividing line by canceling out the influence of the change in hologram diffraction angle resulting from wavelength fluctuations. This makes it possible to prevent an offset from occurring in a tracking error signal or a focusing error signal. However, the HOE necessitates two pieces of hologram elements.

According to the latter, to prevent an offset from occurring in a focusing error signal FES, in addition to two main light receiving domains, an auxiliary light receiving domain is provided. The auxiliary light receiving domain detects return light which expands out of the two main light receiving domains in a greatly defocusing state. Since FES curves derived from a plurality of layers do not interfere with one another, no offset is produced. In this case, however, it is impossible to avoid causing an offset in a tracking error signal.

SUMMARY OF THE INVENTION

An object of the invention is to provide an optical pickup and a hologram laser that are capable of reading out information from a target information recording surface without fail by canceling a DC offset which appears in a tracking signal-detection signal.

The invention provides an optical pickup comprising:

a laser light source;

a diffraction grating for splitting laser light emitted from the light source into three light beams which are a main beam as a zeroth order diffracted light beam and two sub beams as ± first-order diffracted light beams;

an objective lens for converging laser light onto an information recording surface of an optical disk;

a hologram for deflecting return light which travels toward the laser light source after being reflected from the optical disk, by exploiting a diffraction effect; and a light receiving element for receiving the return light deflected by the hologram, wherein a light receiving portion of the light receiving element is divided into a plurality of light receiving domains, and wherein the plurality of light receiving domains include an auxiliary light receiving domain disposed adjacent to a set of light receiving domains on which the two sub beams are incident individually.

According to the invention, the light receiving portion of the light receiving element is divided into a plurality of light receiving domains. The plurality of light receiving domains include the auxiliary light receiving domain disposed adjacent to the set of light receiving domains on which the two sub beams are incident individually. In this way, the light returned from a different information recording surface from the one kept in an information-reading state can be received properly, and the resultant signal can be used to reduce an DC offset. Hence, with the readable/writable optical pickup, it is possible to read out information recorded in each of information recording layers of a disk having a double-layer information recording surfaces without fail.

In the invention, the hologram is divided by a dividing line running in a direction which is perpendicular to a direction equivalent to a track direction of the optical disk.

According to the invention, the hologram is divided by a dividing line running in a direction which is perpendicular to a direction equivalent to the track direction of the optical disk. This helps facilitate formation of one main light receiving domain which bears an image and the other main light receiving domain which does not bear an image in accordance with the track direction, whereby making it possible to increase the intensity of a signal which is generated on the basis of the difference in light receiving quantity between the main light receiving domains.

In the invention, the auxiliary light receiving domain is arranged in a direction which is approximately equivalent to the diffraction direction of the hologram with respect to the main light receiving domain on which the main beam is incident.

According to the invention, the auxiliary light receiving domain is arranged in a direction which is approximately equivalent to the diffraction direction of the hologram with respect to the main light receiving domain on which the main beam is incident. This makes it possible to receive the light returned from a non-targeted information recording surface in a defocusing state with efficiency.

In the invention, the auxiliary light receiving domain is arranged in front and behind the main light receiving domain in a direction which is approximately equivalent to the diffraction direction of the hologram with respect to the main light receiving domain.

According to the invention, the auxiliary light receiving domain is arranged in front and behind the main light receiving domain in a direction which is approximately equivalent to the diffraction direction of the hologram with respect to the main light receiving domain. Thus, even if the light returned from a non-targeted information recording surface in a defocusing state is shifted far or near, an image formed by the return light can be received properly.

In the invention, the plurality of light receiving domains include: a set of three light receiving domains corresponding to the ± first-order diffracted light beams generated in the hologram; one auxiliary light receiving domain disposed adjacent to the light receiving domain on which one of the sub beams of the ± first-order diffracted light beams is incident; and another auxiliary light receiving domain disposed adjacent to the light receiving domain on which the other of the sub beams of the ± first-order diffracted light beams is incident.

According to the invention, the plurality of light receiving domains include the set of three light receiving domains corresponding to the ± first-order diffracted light beams generated in the hologram, and the auxiliary light receiving domains disposed adjacent to the light receiving domains on which the sub beams of ± first-order diffracted light beams are incident individually. By using these three beams effectively, a reduction in DC offset can be achieved.

In the invention, the auxiliary light receiving domain is composed of a plurality of segments arranged in a direction which is approximately perpendicular to the diffraction direction of the hologram with respect to the main light receiving domain, and the segments are each so shaped as to elongate in a direction which is approximately perpendicular to the direction equivalent to the track direction of the optical disk.

According to the invention, the auxiliary light receiving domain is composed of the plurality of segments arranged in the direction which is approximately perpendicular to the diffraction direction of the hologram with respect to the main light receiving domain. Moreover, the segments are each so shaped as to elongate in a direction which is approximately perpendicular to the direction equivalent to the track direction of the optical disk. This makes it possible to receive the light returned from the information recording surface in a defocusing state with ease.

In the invention, the auxiliary light receiving domain is further disposed adjacent to the light receiving domain on which the main beam is incident.

According to the invention, the auxiliary light receiving domain is further disposed adjacent to the light receiving domain on which the main beam is incident. Thus, an image formed by the main beam in a deviated position can be acquired reliably, thereby achieving cancellation of a DC offset.

In the invention, the auxiliary light receiving domain is arranged in a direction which is approximately equivalent to the diffraction direction of the hologram with respect to the main light receiving domain on which the main beam is incident.

According to the invention, the auxiliary light receiving domain is arranged in the direction which is approximately equivalent to the diffraction direction of the hologram with respect to the main light receiving domain on which the main beam is incident. This makes it possible to receive the return main beam without fail, and thereby achieve a reduction in DC offset.

In the invention, the diffraction grating for splitting laser light emitted from the laser light source into three beams is formed of a phase-shift diffraction grating.

According to the invention, laser light emitted from the laser light source is split into three beams by the phase-shift diffraction grating. This makes it possible to effect tracking servo without performing rotational adjustment to the three beams.

In the invention, the hologram is formed of a polarizing hologram element in which a light component having one given polarization direction is substantially entirely transmitted without being diffracted, whereas another light component having the other polarization direction is diffracted as diffraction light.

According to the invention, the hologram is formed of the polarizing hologram element in which a light component having one given polarization direction is substantially entirely transmitted without being diffracted, whereas the other light component having the other polarization direction is diffracted as diffraction light. By using the polarizing hologram element, it is possible to avoid a loss in laser light traveling toward the optical disk.

In the invention, the laser light source, the light receiving element, the diffraction grating, and the hologram are combined together to constitute a single unit of a hologram laser.

According to the invention, the laser light source, the light receiving element, the diffraction grating, and the hologram are combined together to constitute a single unit of a hologram laser. This makes it possible to achieve miniaturization and simultaneously provide higher reliability.

The invention further provides a hologram laser that is employed in the optical pickup as mentioned above, comprising:

the laser light source;
the light receiving element;
the diffraction grating;
the hologram; and
a package,
wherein the laser light source and the light receiving element are housed in the package, and
the diffraction grating and the hologram are attached to a surface of the package.

According to the invention, the hologram laser to be employed in the optical pickup as mentioned above is so designed that the laser light source and the light receiving element are housed in the package, and that the diffraction grating and the hologram are attached to the surface of the package. With this construction, the hologram laser will succeed in down-sizing and providing higher reliability as a component constituting the optical pickup.

BRIEF DESCRIPTION OF THE DRAWINGS

Other and further objects, features, and advantages of the invention will be more explicit from the following detailed description taken with reference to the drawings wherein:

FIGS. 12A and 12B are views of a fifth embodiment of the invention, illustrating a case where the beam size method is adopted to obtain a focusing control signal;

DETAILED DESCRIPTION

Figure 1:
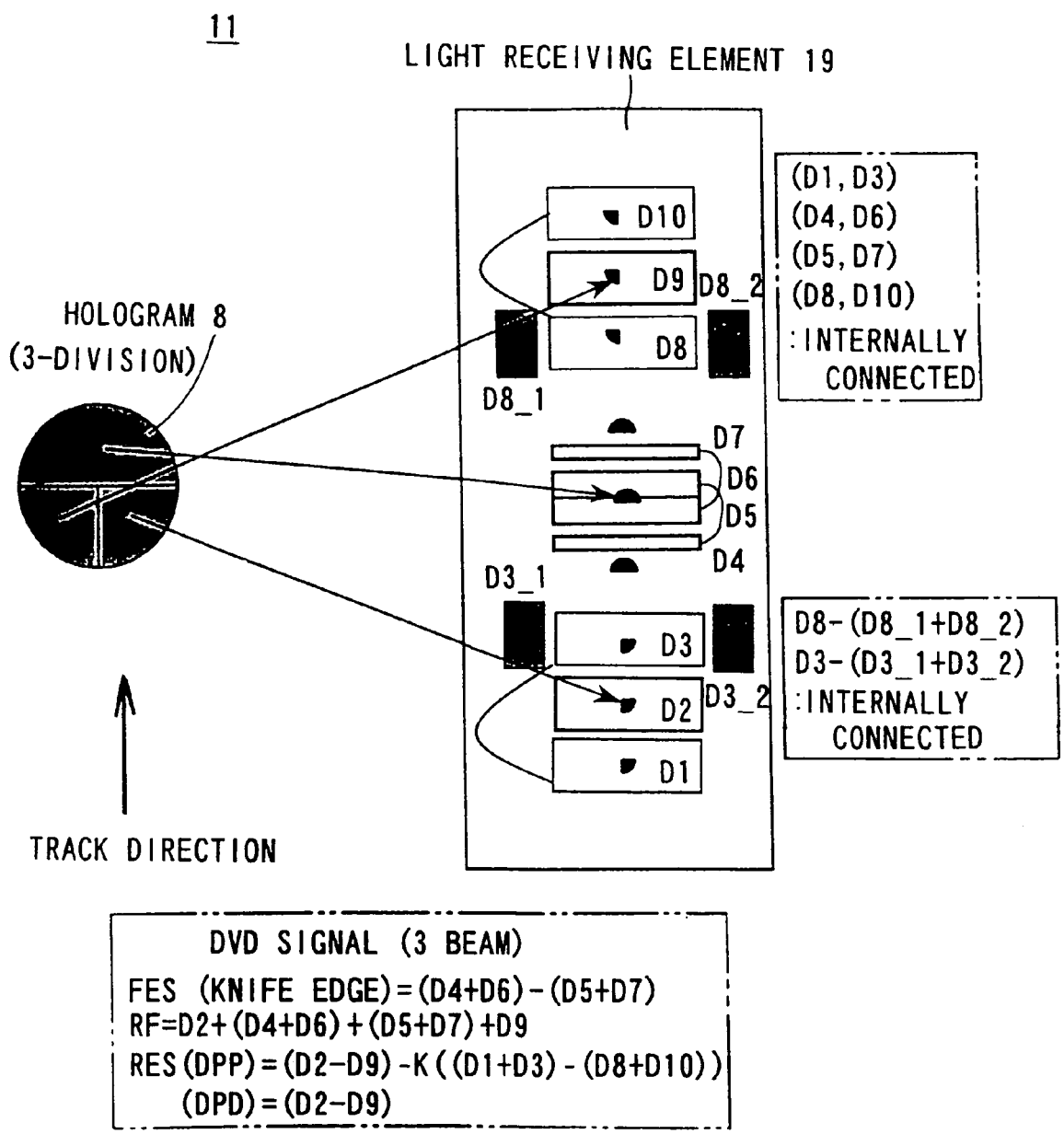
FIG. 1 is a view of an optical pickup according to a first embodiment of the invention, illustrating the arrangement of its light receiving domains with respect to a hologram.

Now referring to the drawings, preferred embodiments of the invention are described below.

Figure 14:
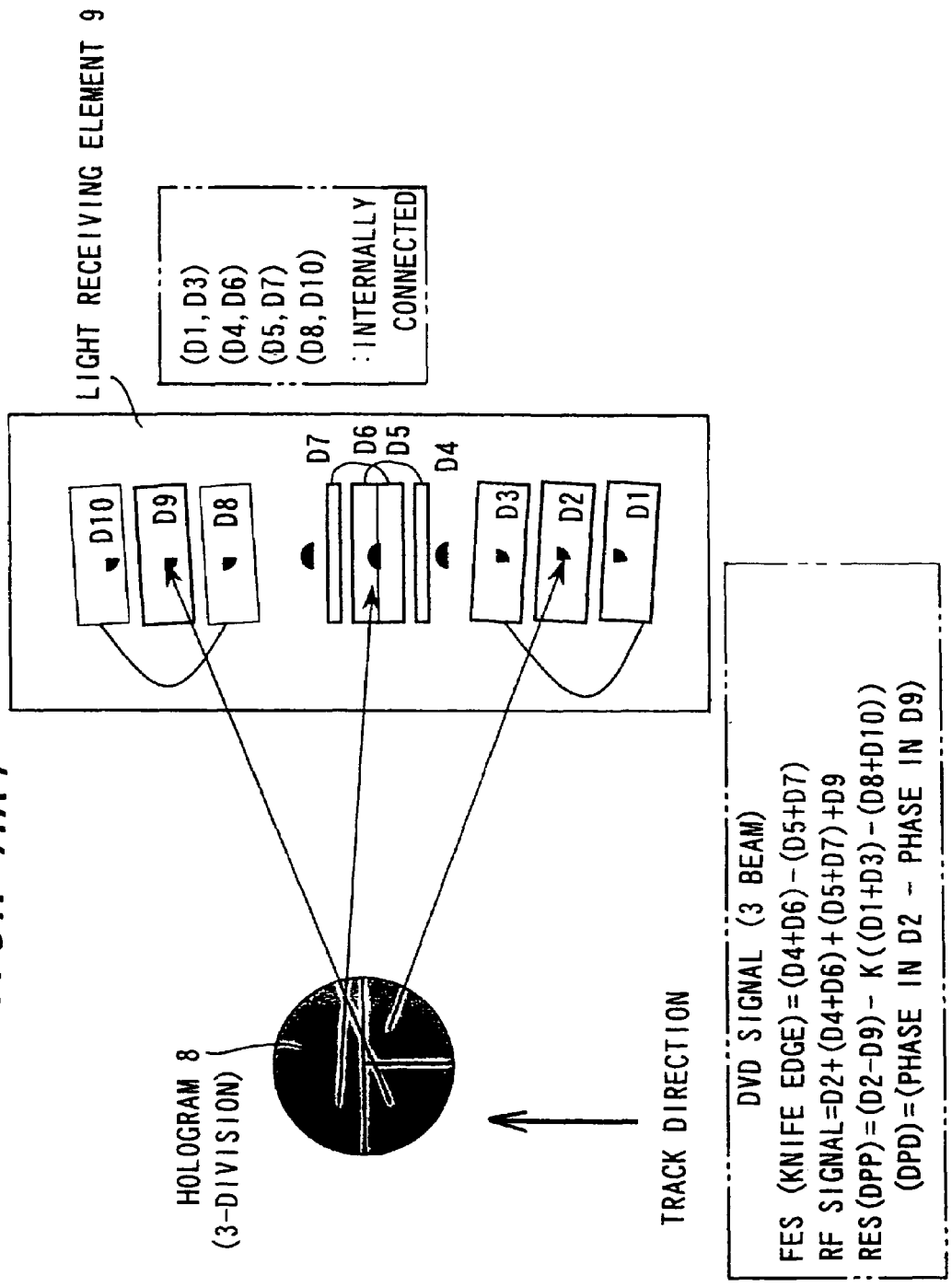
FIG. 14 is a view showing a pattern of the hologram of the conventional hologram element, the configuration of light receiving domains in the light receiving portion of the light receiving element corresponding to the hologram pattern, and a method for reading out a signal.
Figure 15:
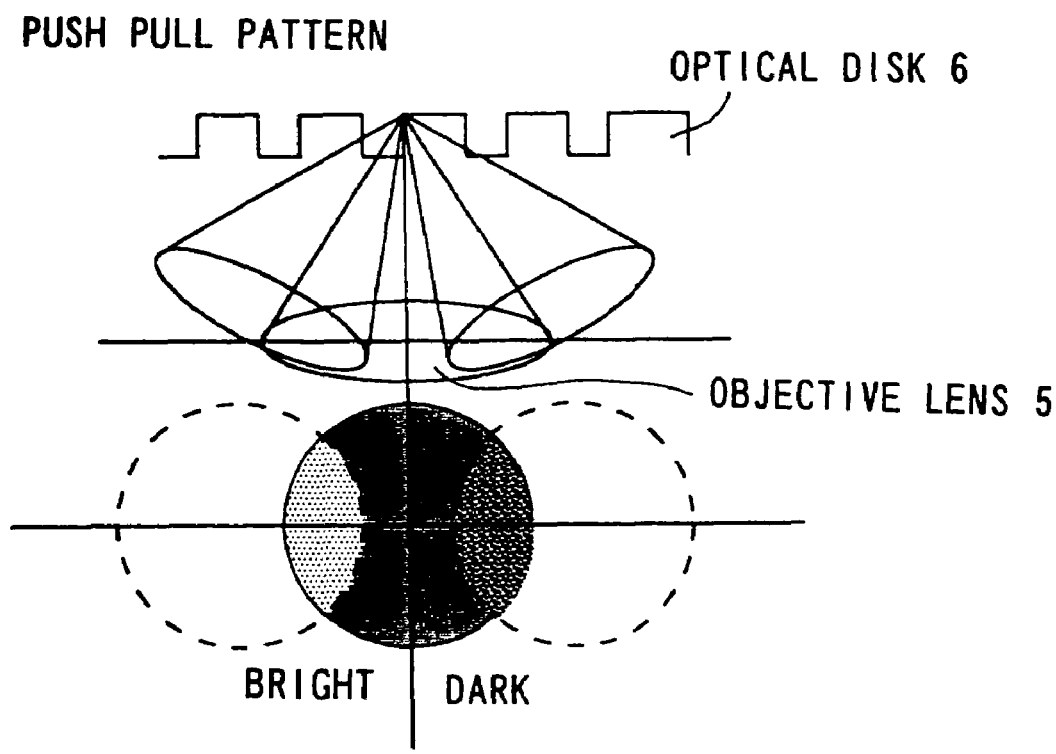
FIG. 15 is a view showing the theory of the push pull pattern which has hitherto been used in tracking control.

FIG. 1 is a view of an optical pickup 11 according to a first embodiment of the invention, illustrating the arrangement of its light receiving domains with respect to the hologram 8. The optical pickup 11 is designed for use in reading out information from a double-layer disk or the like by means of the 3-beam method. Here, the components that play the same or corresponding roles as in the conventional example as shown in FIG. 14, etc. will be identified with the same reference numerals, and overlapping descriptions will be omitted.

A light receiving element 19 used for signal detection is constituted by a photodiode or the like element. Just as in the case of the conventional example, the light receiving portion thereof is divided into a plurality of light receiving domains. A direction in which the light receiving domain segment is elongated is aligned with a direction in which light is diffracted by the hologram 8. Although, in the figure, the light receiving domain segments are each illustrated as being elongated in parallel with a certain direction regardless of the direction of light, in reality, like the conventional example shown in FIG. 14, the light receiving domain segments are elongated in different directions according to the direction of incident light. Specifically, for example, the light receiving domains D8, D9, and D10 slant gradually upward to the right, whereas D3, D2, and D1 slant gradually downward to the right.

By arranging the light receiving domains in that way, even if the diffraction angle of the hologram 8 is varied due to laser wavelength fluctuations resulting from ambient temperature changes or other factors, and consequently the light incident on the light receiving element 19 travels in the elongation direction of the light receiving domain segment, the received light beam can be prevented from straying out of the segment configuration of the light receiving domain.

One of the sub beams which is + first-order diffracted light beam is incident on the light receiving domains D3 and D10. The other sub beam which is − first-order diffracted light beam is incident on the light receiving domains D1 and D8. Note that the diffraction direction of the hologram 8 conforms to the horizontal direction on the plane of the paper sheet. With respect to the diffraction direction, one auxiliary light receiving domains D3_1 and D3_2 are provided on both outer sides of the light receiving domain D3, and likewise, other auxiliary light receiving domains D8_1 and D8_2 are provided on both outer sides of the light receiving domain D8. Since signals are computed as: D8−(D8_1+D8_2); and D3−(D3_1+D3_2) by means of the internal connection, it is possible to achieve cancellation of a DC offset in RES signals (D1+D3 and D8+D10) used in the DPP method for tracking servo control. Focusing servo control is carried out by means of the knife-edge method, by which FES signals are computed. Information is read out on the basis of RF signals.

Figure 2:
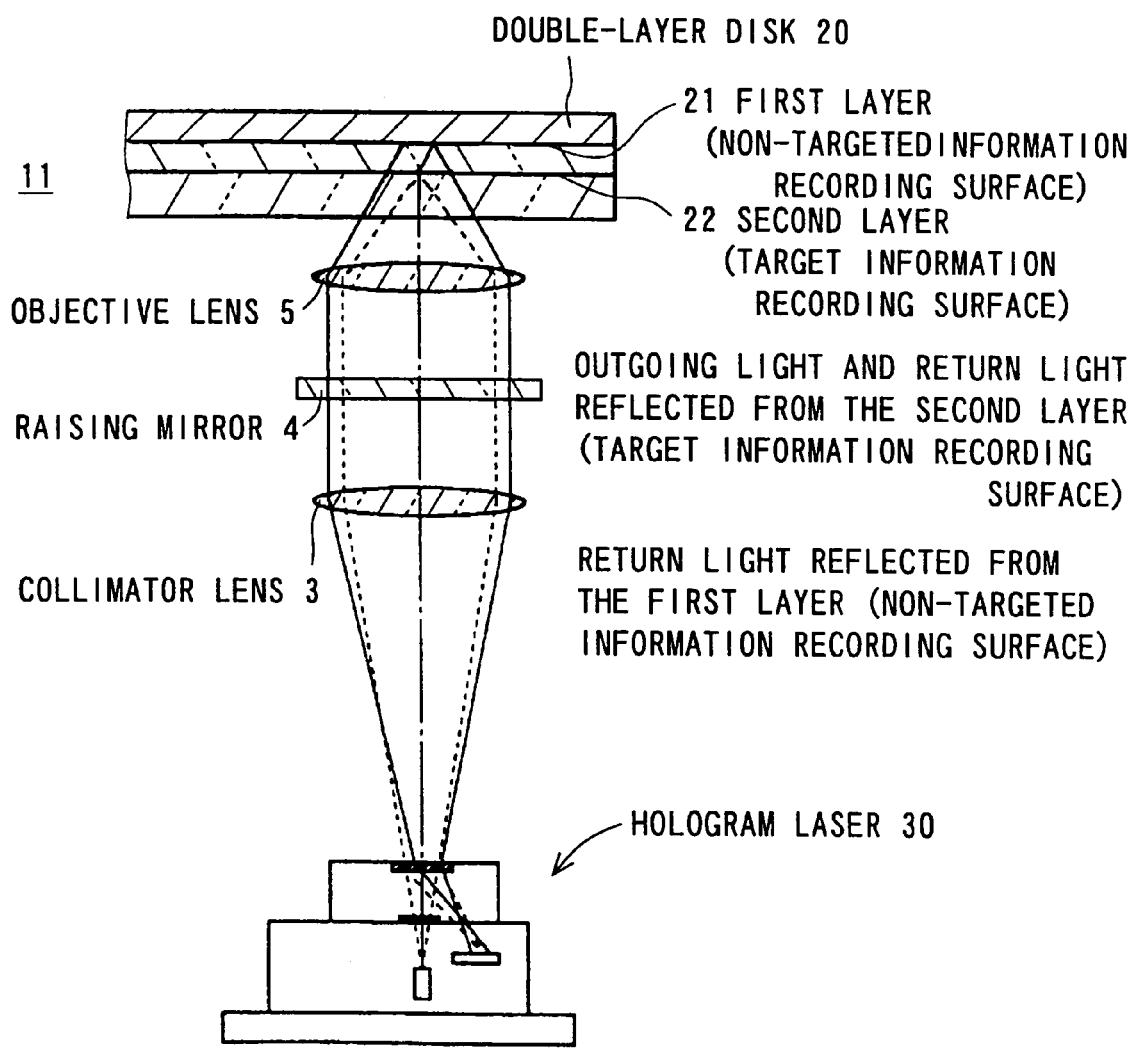
FIG. 2 is a simplified sectional view of the optical pickup shown in FIG. 1, illustrating how information is read out from a double-layer disk.

FIG. 2 is a view illustrating how information is read out from a double-layer disk 20. In the figure, a raising mirror 4, which has basically the same structure as that of the conventional example shown in FIG. 14, is shown schematically. The raising mirror 4 is used solely to change the direction of light so as to reduce the thickness of the apparatus as seen in a direction perpendicular to the target information recording surface, and is thus not associated with the essential performance of the optical pickup 11. Here, it is assumed that, in the double-layer disk 20, a first-layer information recording surface 21 is a non-targeted information recording surface (a surface kept in a non-reading state), whereas a second-layer information recording surface 22 is a target information recording surface (a surface kept in a reading state). A hologram laser 30 according to the embodiment will be described later.

Figure 3:
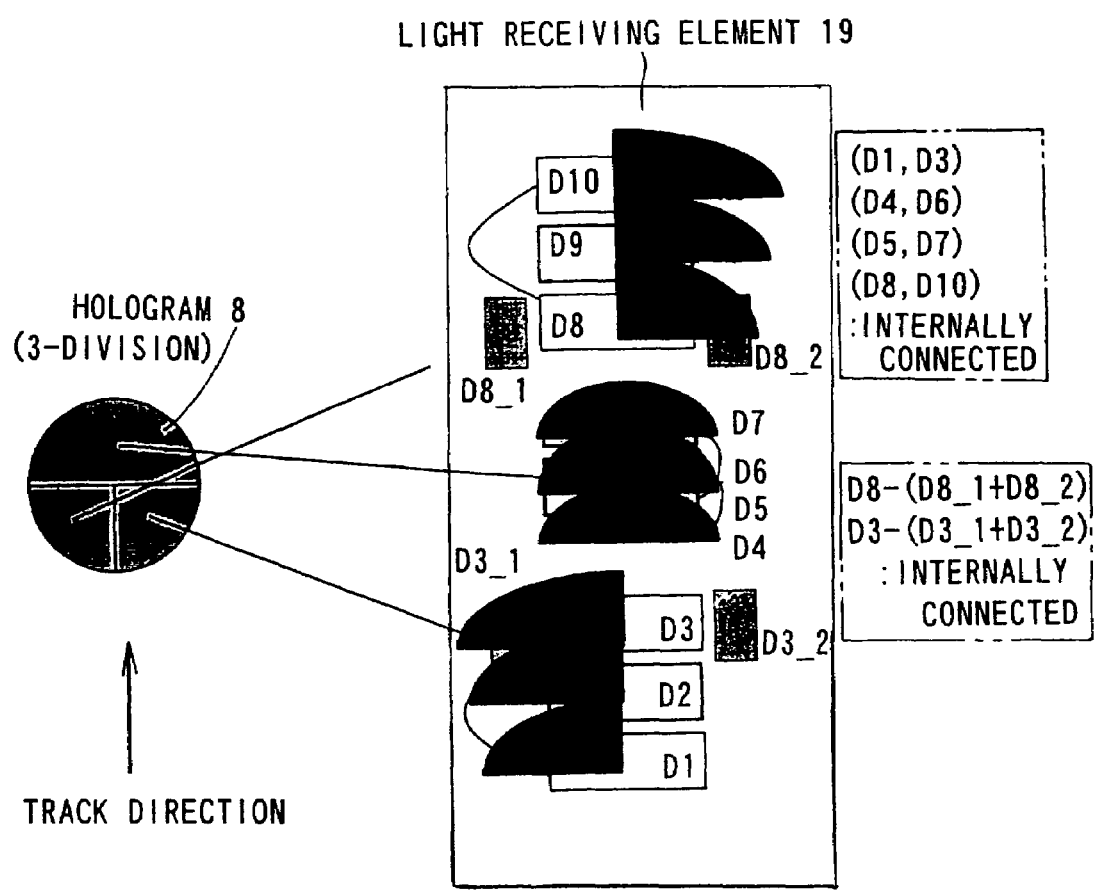
FIG. 3 is a view of the optical pickup, illustrating a case where images formed by the light reflected from an information recording surface kept in a non-reading state are present in the light receiving domains shown in FIG. 1.

FIG. 3 is a view of the optical pickup 11, illustrating a case where images formed by the light reflected from the non-targeted information recording surface 21 are present in the light receiving domains shown in FIG. 1. Each of the images is expressed as a shaded area. From this, it will be understood that the image derived from the non-targeted information recording surface 21 is out of focus, and is thus so enlarged that its front end spreads into the auxiliary light receiving domains D3_1 and D8_2. Meanwhile, as shown in FIG. 1, the auxiliary light receiving domains D3_1 and D8_2 are free of an image formed by the light returned from the target information recording surface. Hence, the signal from the auxiliary light receiving domains D3_1 and D8_2 includes only the component corresponding to the light returned from the non-targeted information recording surface. By exploiting the signals from the auxiliary light receiving domains D3_1 and D8_2, cancellation of a DC offset can be achieved.

Figure 4:
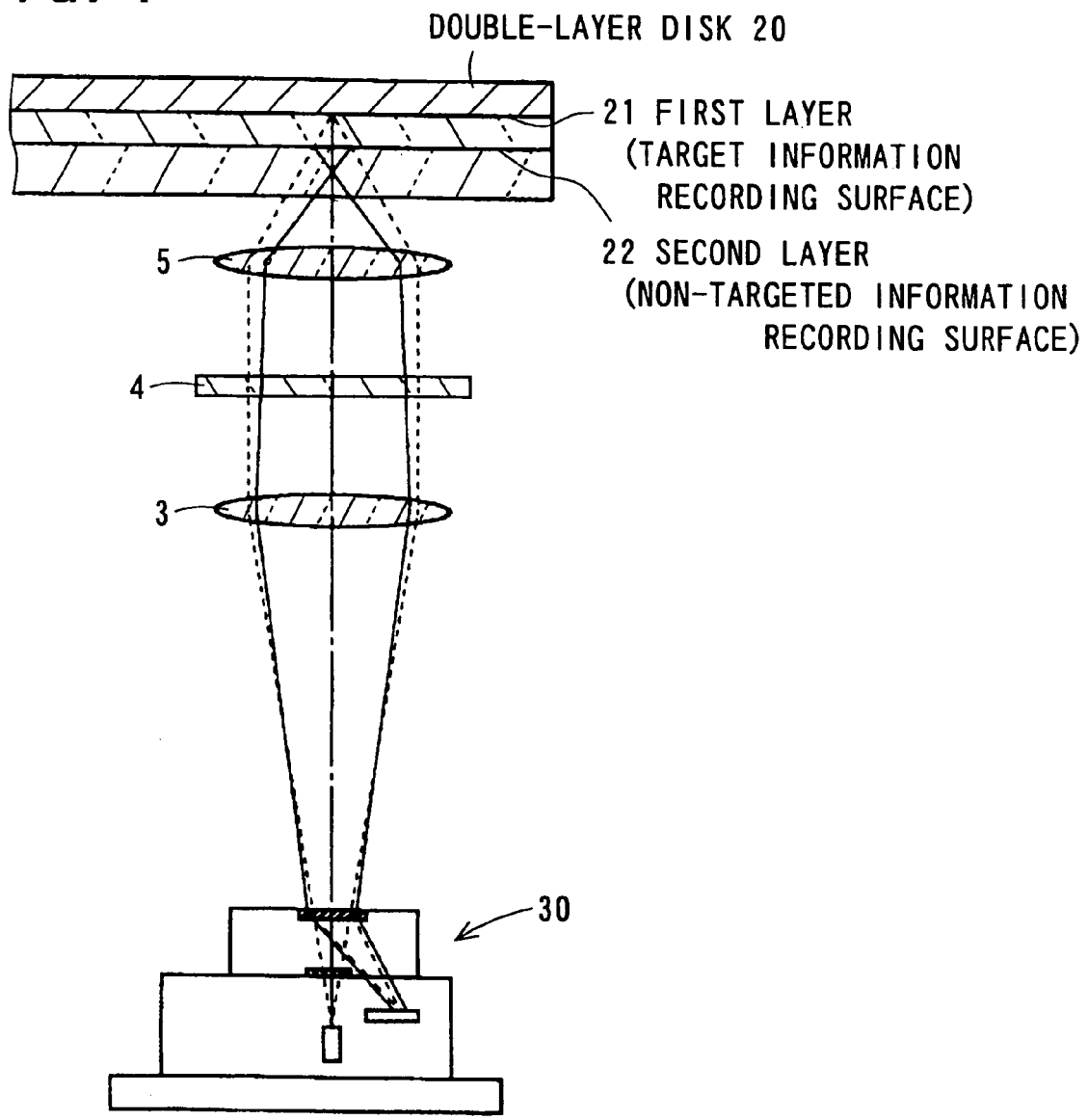
FIG. 4 is a simplified sectional view of the optical pickup shown in FIG. 1, illustrating how information is read out from the double-layer disk.
Figure 5:
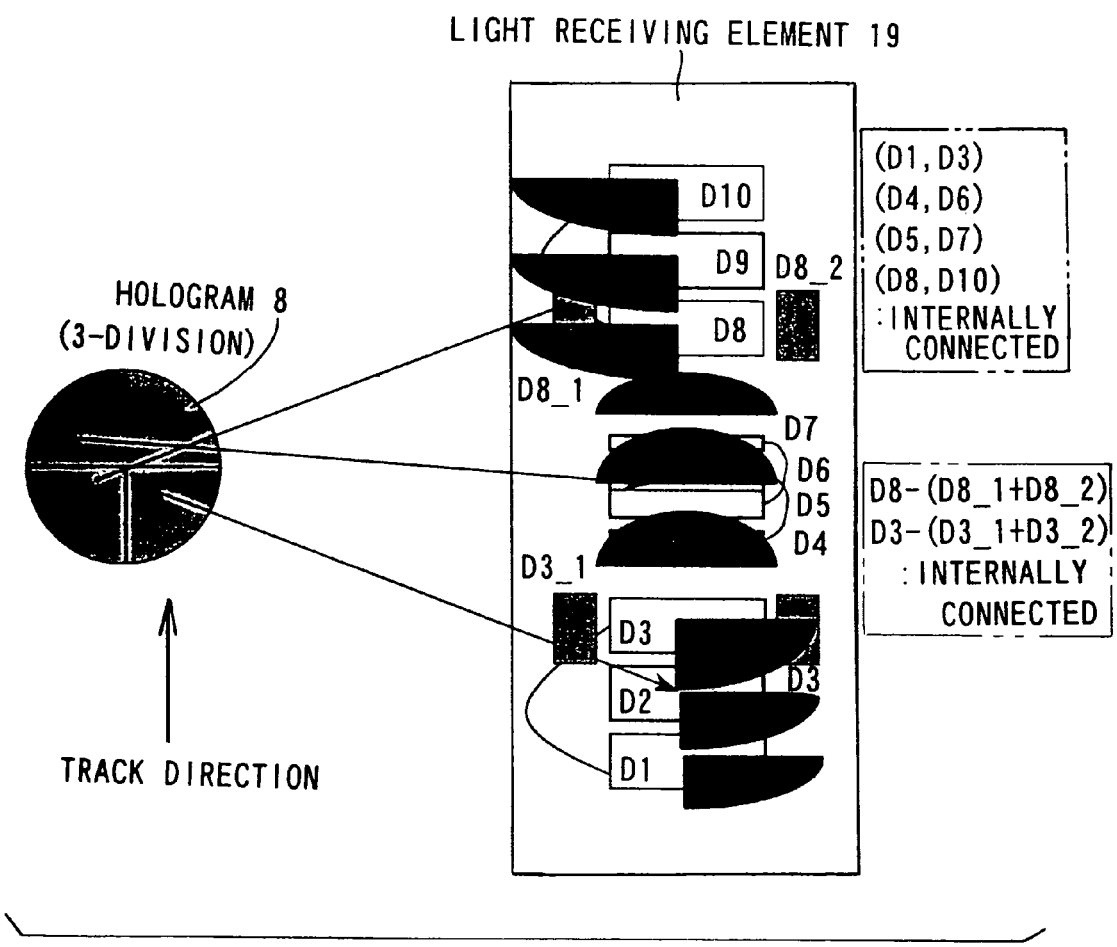
FIG. 5 is a view of the optical pickup, illustrating a case where images formed by the light reflected from an information recording surface kept in a non-reading state are present in the light receiving domains shown in FIG. 1.

FIGS. 4 and 5 each show a case where the information recording surface 21 kept in a reading state is arranged at the rear relative to the information recording surface kept in a non-reading state in the double-layer disk 20. From this, it will be understood that the image derived from the non-targeted information recording surface 22 is out of focus, and is thus so enlarged that its front end spreads into the auxiliary light receiving domains D3_2 and D8_1. Thus, by exploiting the signals from the auxiliary light receiving domains D3_2 and D8_1, cancellation of a DC offset can be achieved.

As described hereinabove, the light receiving element 19 is provided with a plurality of light receiving domains to receive diffracted light beams coming from the hologram 8 formed in the hologram element as will be described layer. The light receiving domains respectively receive the light returned from the optical disk 6 or the light returned from the double-layer disk 20. In the vicinity of the light receiving domains are arranged the auxiliary light receiving domains D8_1, D8_2, D3_1, and D3_2 for canceling an offset. Note that, in FIG. 10, additional auxiliary light receiving domains D10_1, D10_2, D1_1, and D1_2 are provided, which will be described later. These auxiliary light receiving domains are arranged in a direction which is approximately equivalent to the diffraction direction of the light from the hologram element. In the case where those auxiliary light receiving domains D8_1, D8_2, D3_1, and D3_2 are arranged in a direction perpendicular to the diffraction direction, the three beams need to be spaced at a correspondingly larger interval. However, increasing the inter-beam interval gives rise to a problem of the light receiving element 19 being larger, as well as a problem of rotational adjustment being difficult.

In the case of reading out information from and/or recording information on the optical disk 6 having a single-layer information recording surface 7, the light receiving element 19 is free of a light beam which is likely to cause a DC offset. However, in the case of reading out information from the double-layer disk 20 having the two-layer information recording surfaces 21 and 22 as recording regions, or from a multilayer disk having two or more information recording layers, the light reflected from a different layer from the one kept in a reading state spreads out to be incident on the light receiving portion of the light receiving element 19. Part of the reflection light is incident both on the light receiving domain for signal-reading and the auxiliary light receiving domain. A signal generated in response to the light incident on the auxiliary light receiving domain is used to obtain a difference in value between the signal generated in response to the light incident on the auxiliary light receiving domain and a signal generated in response to the light incident on a main light receiving domain acting as a signal-acquiring segment. In general, the signal difference thus obtained is electrically computed by a signal processing mechanism within the light receiving element 19. In this way, the light that entered the main light receiving domain for reading out signals can be canceled by using the results of the computation, whereby making it possible to reduce a DC offset.

Moreover, in the light receiving element 19, with respect to the diffraction direction of the hologram 8, the auxiliary light receiving domains are arranged in front and behind a position where signal light is to be received. After all, depending on whether the layer kept in a reading state is located close to or far away from the objective lens 5, light is varied in return position on the light receiving portion of the light receiving element 19. In view of the foregoing, by arranging the auxiliary light receiving domains in the above-described manner, cancellation of a DC offset can be achieved whichever layer produces return light of signals. Besides, in contrast to the case of arranging the auxiliary light receiving domains in a direction perpendicular to the diffraction direction, said arrangement is more desirable from the standpoint of securing sufficient space between the domains.

Figure 6:
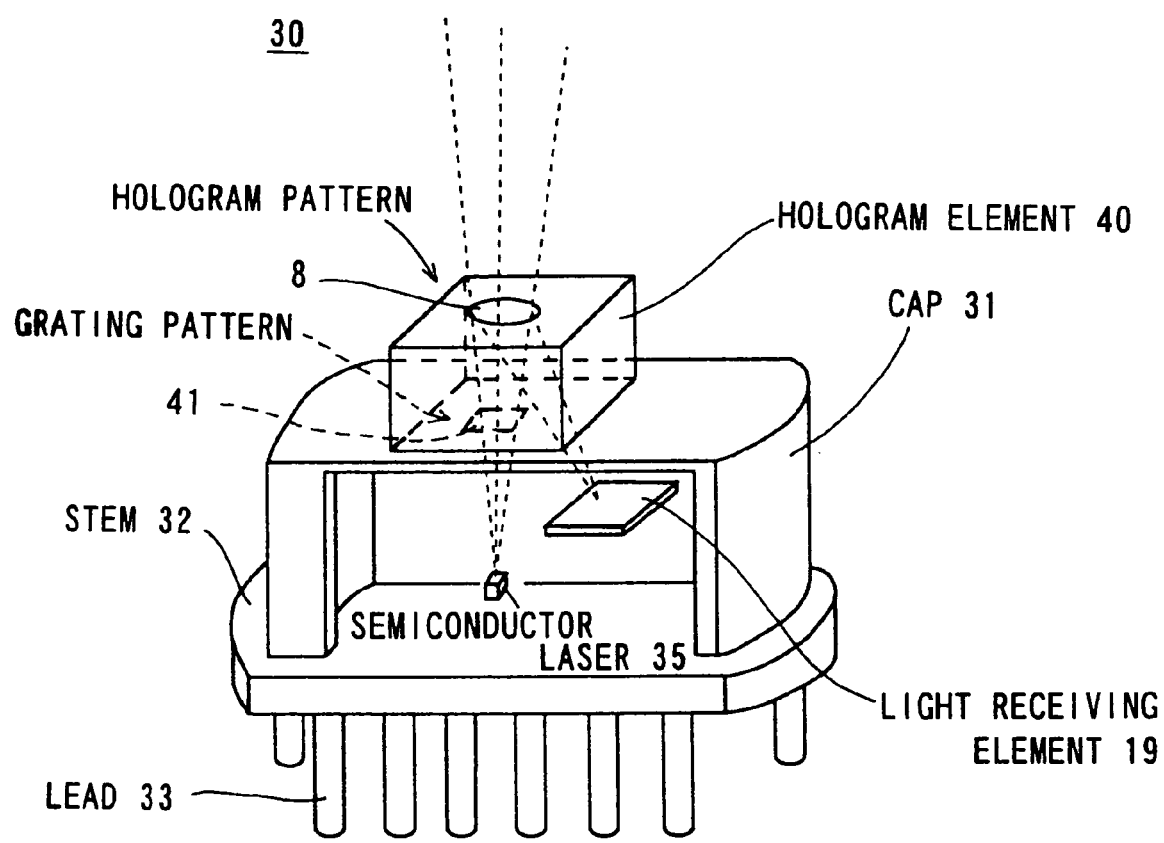
FIG. 6 is a perspective view sectionally showing the structure of a hologram laser shown in FIG. 2 in part.

FIG. 6 is a view sectionally showing the structure of the hologram laser 30 according to the embodiment in part. A cap 31 and a stem 32 constitute a package for housing the constituent components including the light receiving element 19. The stem 32 is disposed on the bottom portion of the cap 31. A plurality of leads 33 are led out, in an electrically inter-insulated state, from the stem 32. In the space created by the cap 31 and the stem 32 is also housed a semiconductor laser 35.

The semiconductor laser 35 is formed of an infrared laser for emitting infrared laser light having an emission wavelength of 780 nm, or a red laser for emitting red light having an emission wavelength of 650 nm. The light receiving element 19, which is formed of a signal-detection photodiode or the like, is mounted on a heat-dissipating base.

The semiconductor element acting as the semiconductor laser 35 and the signal-detection photodiode acting as the light receiving element 19 are sealed by the cap 31 to prevent a minute component, such as a wire for providing electrical connection with the lead, from outside contact. Entry and exit of laser light is made through a window formed in the cap 31. In this construction, the semiconductor laser 35 and the light receiving element 19 can be operated on a trial basis to find out imperfections prior to the adjustment or mounting of the hologram 8. This helps reduce the number of needless operations.

The semiconductor laser 35 may preferably be mounted on a sub mount made of silicon (Si), silicon carbide (SiC), or the like, or mounted directly on the heat-dissipating plate of the stem 32. The cap 31 is made of a glass material, for example. In order to prevent occurrence of condensation, it is preferable that the package covered by the glass contains dry air inside, or is maintained in a breathable state. The package for mounting therein the semiconductor chip of the semiconductor laser 35, the light receiving element 19, and the other components is not limited to the configuration in which external connection is established through the lead 33, but may be of another configuration in which the lead is molded of a resin material.

The package for mounting therein those optical components should preferably be ovally shaped. The first purpose of adopting an ovally-shaped package is to decrease the vertical thickness of the construction with respect to the optical disk 6. The thickness of the optical pickup is dependent on a straight-line segment (a direction of a chord) of the package contour. Thus, an ovally-shaped package is more advantageous than a circular-shaped package in terms of reducing the thickness of the optical pickup as a whole.

Figure 16B:
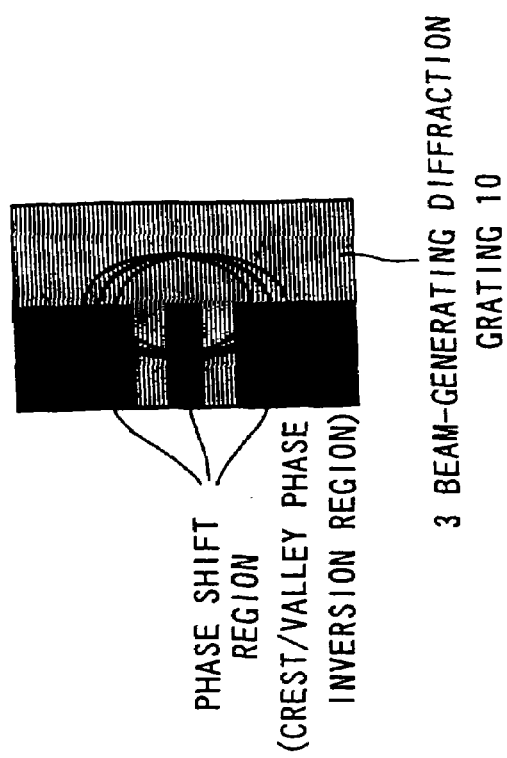
FIGS. 16A and 16B are views showing the structure and functions of a conventional 3-beam-generating diffraction grating.
Figure 16A:
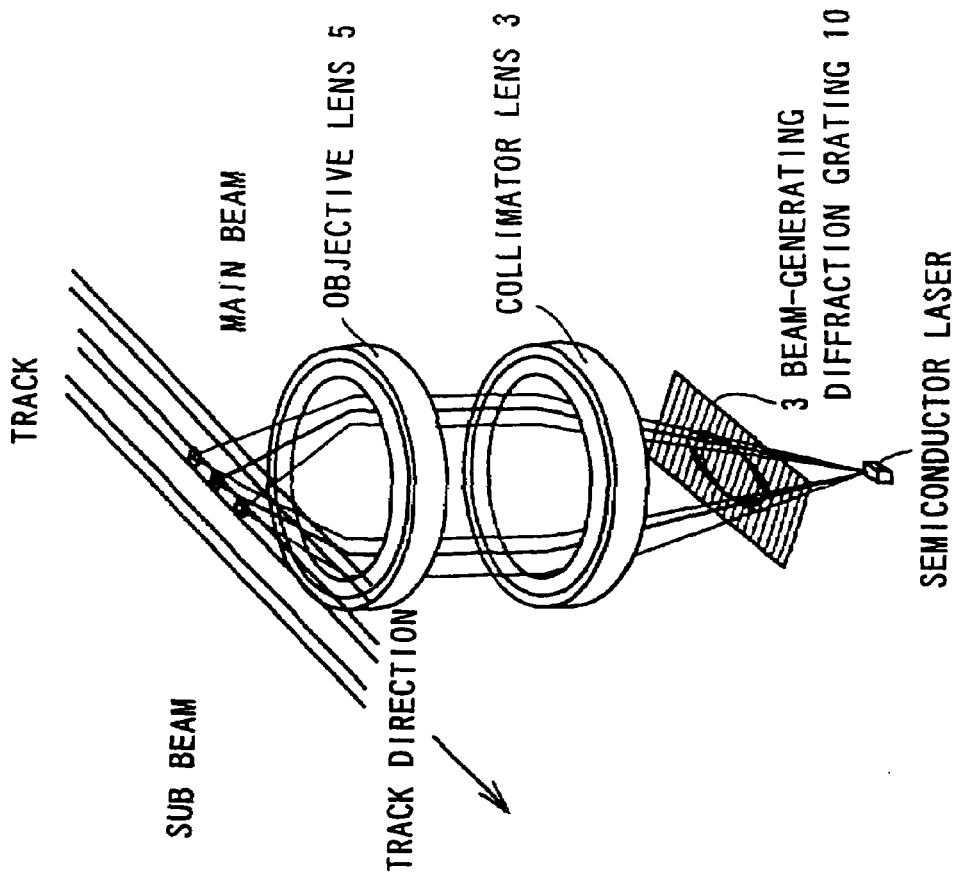
Figure 17A:
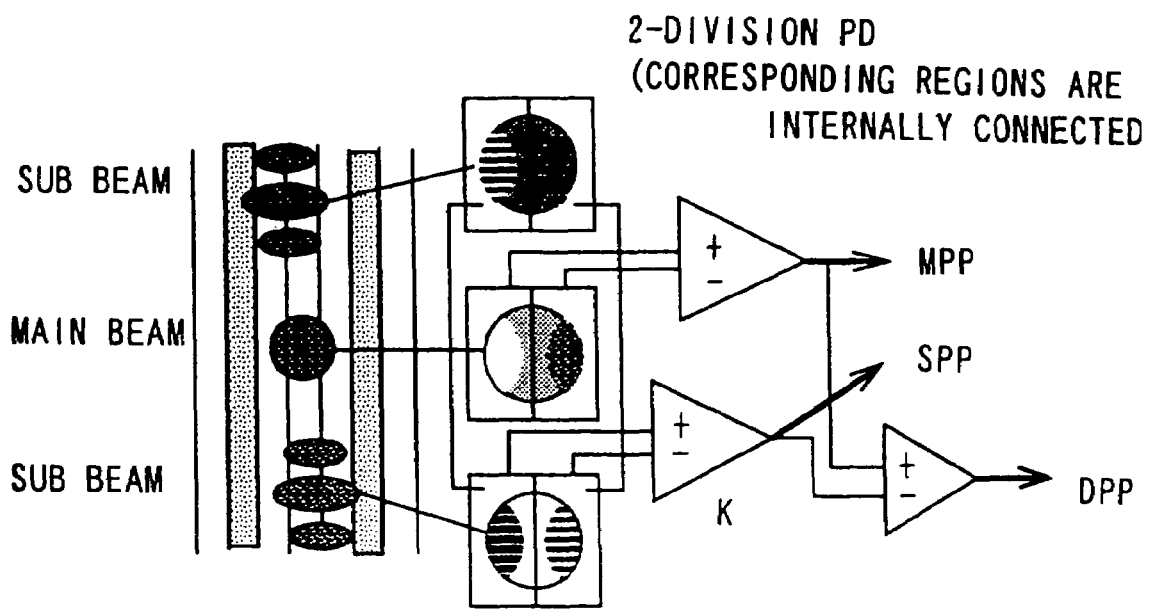
FIGS. 17A and 17B are views showing the theory of the phase shift DPP method which has hitherto been adopted.
Figure 17B:
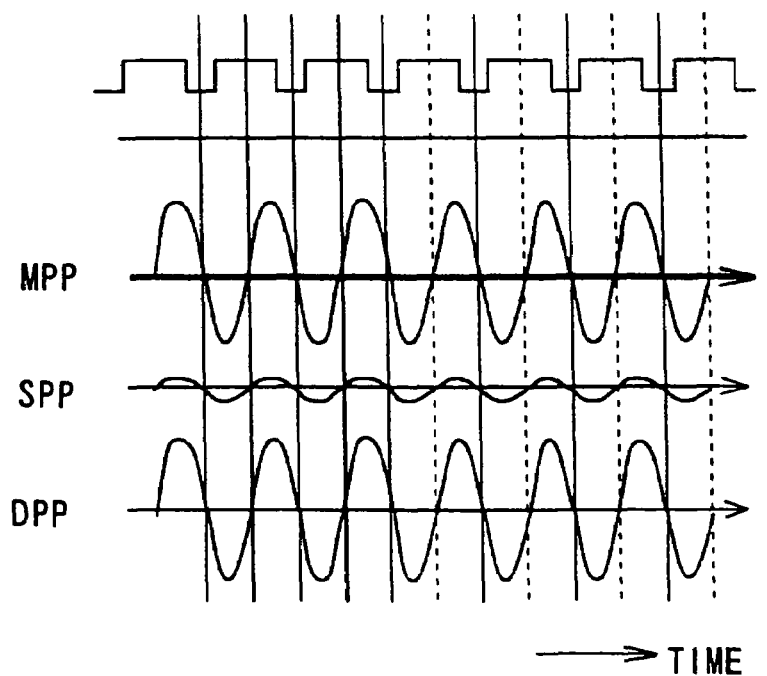

The hologram 8 is formed in a hologram element 40 which is attached to the vertex of the cap 31. On one side of the cap 31 to which the hologram element 40 is attached is formed a light-transmitting window. On one side of the hologram element 40 which faces the window of the cap 31 is formed a diffraction grating 41. The diffraction grating 41 is provided with a grating pattern for splitting laser light into three light beams. One usable example of the grating pattern is shown in FIGS. 16A and 16B. At the vertex of the hologram element 40 is formed the hologram 8 having a hologram pattern.

Figure 7:
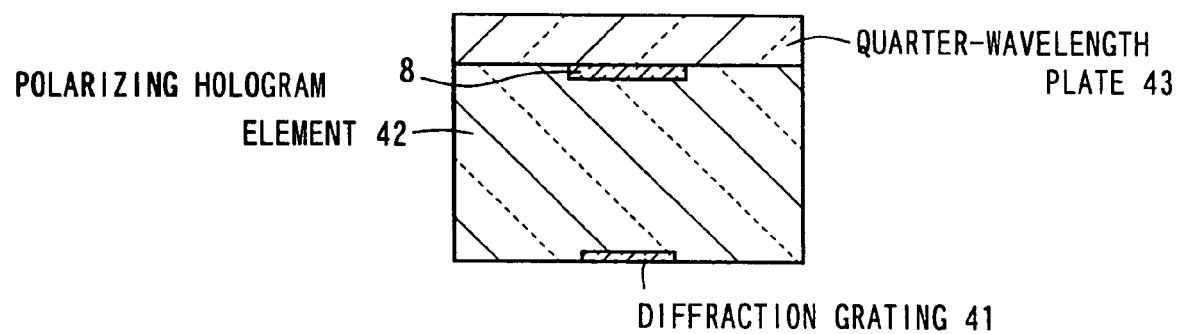
FIG. 7 is a sectional view showing the schematic structure of a hologram element shown in FIG. 6.

FIG. 7 shows the structure of the hologram element 40. The hologram element 40 is used integrally with the package for housing the constituent components including the semiconductor laser 35 and the light receiving element 19. In some cases, the hologram element 40 is built as a polarizing hologram which serves as a hologram element or not depending on the polarization direction of laser light. In the case of employing a polarizing hologram, by using a glass or synthetic resin material possessing translucency and desired optical properties, a polarizing hologram element 42 is formed. The polarizing hologram element 42 has the property of transmitting or diffracting light according to the polarization direction of the light. This is because, in the polarizing hologram element 42, the material constituting the diffraction grating 41 has the property of varying its refractive index according to the polarization direction of light. By exploiting this property, the desired characteristics of the polarizing hologram element 42 can be attained. The polarizing hologram element 42 has the diffraction grating 41 on one surface, and has the hologram 8 on the other surface. On a surface carrying the hologram 8 of the polarizing hologram element 42 may additionally be provided a quarter-wavelength plate 43 in a single-piece structure.

Figure 8A:
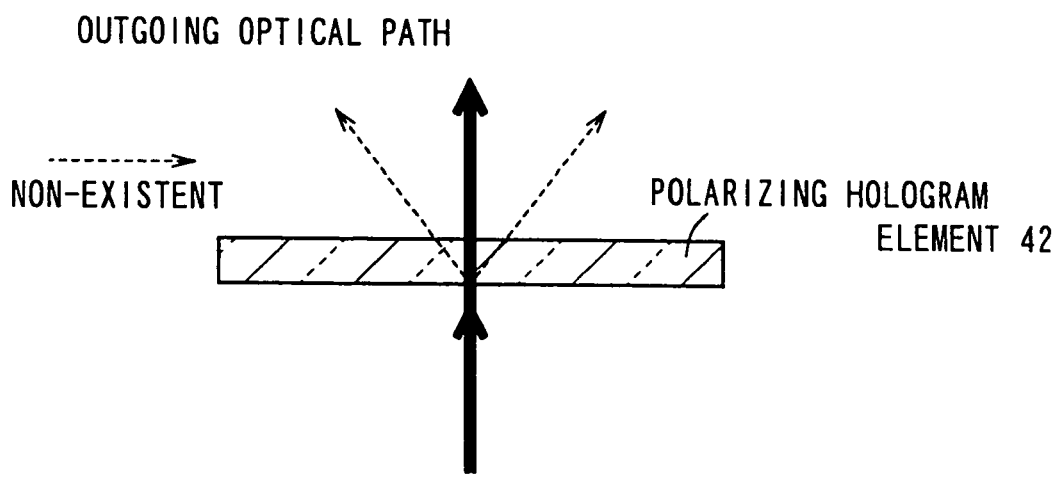
FIGS. 8A and 8B are simplified sectional views showing the working of a polarizing hologram element shown in FIG. 7.
Figure 8B:
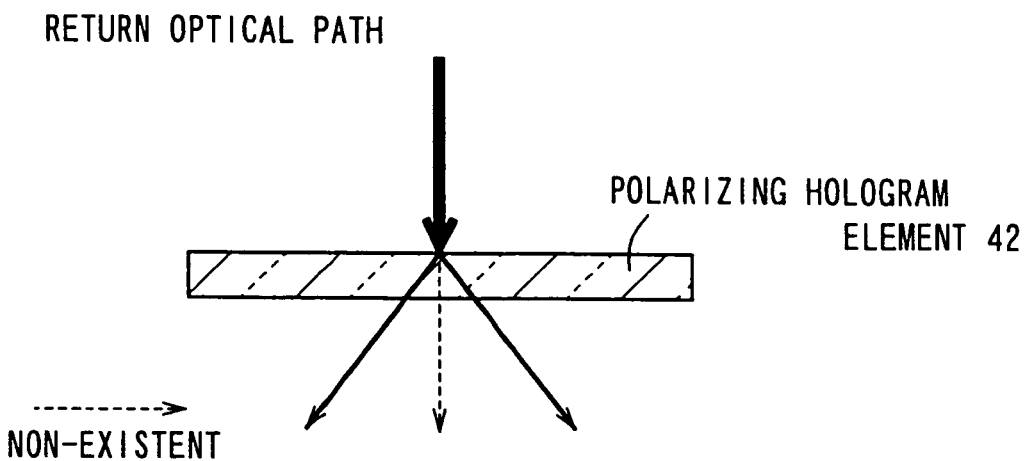

FIGS. 8A and 8B are views showing the working of the polarizing hologram element 42. The quarter-wavelength plate 43 as shown in FIG. 7 is adjusted optimally according to the polarization direction of laser light. In this case, as shown in FIG. 8A, even if an outgoing light beam passes through the hologram, no ± first-order light beam is generated. It will thus be seen that the use of the polarizing hologram element 42 makes it possible to direct a light beam toward the optical disk without causing a loss of laser light. Such a design is especially useful for a recordable optical pickup, because a larger quantity of light can be directed to the optical disk with equal laser power.

As shown in FIG. 8B, in the return optical path, a zeroth order light beam is not generated, but ± first-order light beams are generated. Thus, as compared with the case where no polarizing hologram element 42 is employed, in this optical pickup, the quantity of light incident on the light receiving element 19 can be increased, with the result that the frequency characteristics of the light receiving element 19 can be enhanced. This makes it possible to perform reading/writing operations at higher speed.

In the hologram element of conventional design, when an outgoing light beam passes through the hologram, ± first-order light beams are generated because of diffraction. Since the resultant light beam does not reach the optical disk, a loss of light quantity occurs correspondingly. Thus, in the conventional construction, especially when employed in an optical pickup to be written upon, in contrast to the hologram laser 30 constructed in accordance with the embodiment, even if laser power is emitted equally, the light which reaches the optical disk is decreased in quantity by the loss of light quantity caused in the hologram element. Although depending on the diffraction efficiency of the hologram, approximately 20 to 50% loss may be inevitable.

In order to change the polarization direction of laser light which passes through the polarizing hologram element 42 according to the outgoing/return optical path, the quarter-wavelength plate 43 is arranged between the hologram element 40 and the objective lens 5. As shown in FIG. 7, by forming the quarter-wavelength plate 43 integrally with the hologram element 40, the number of constituent components can be reduced.

Figure 9:
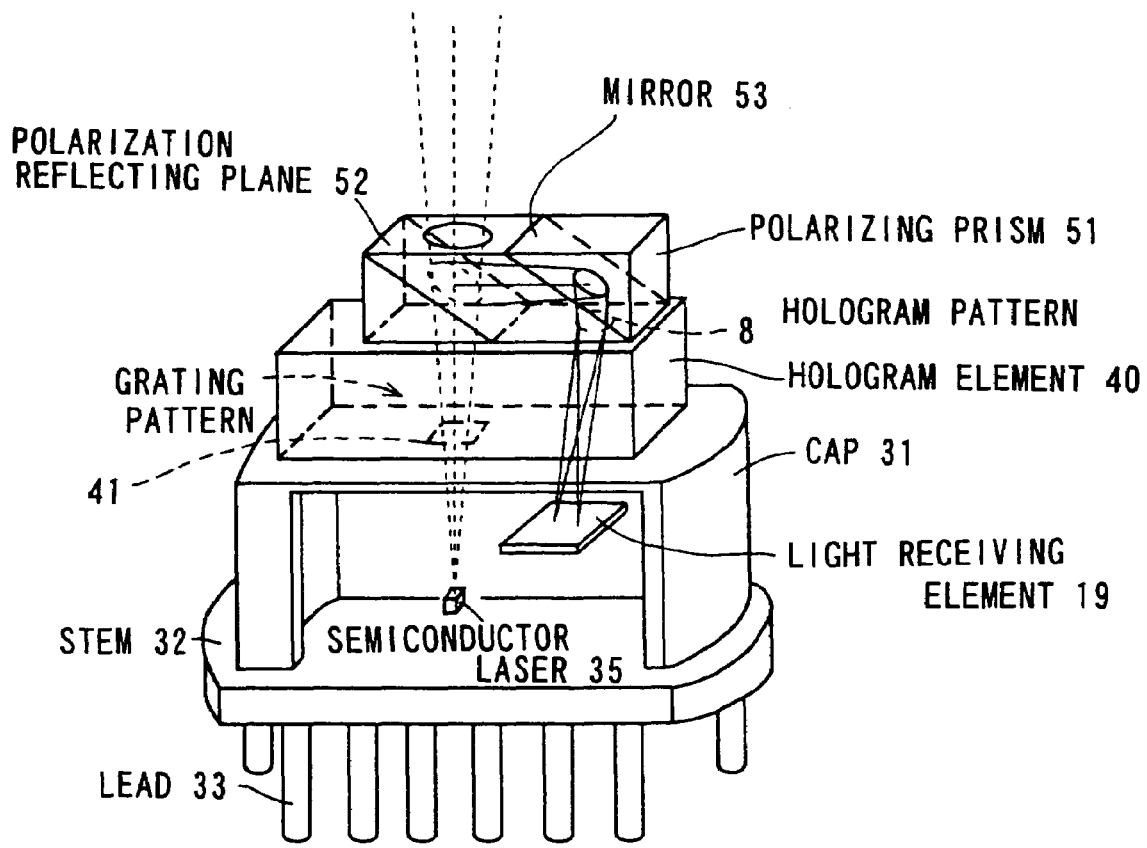
FIG. 9 is a perspective view of a second embodiment of the invention, sectionally illustrating the structure of a hologram laser in part.

FIG. 9 is a view of a second embodiment of the invention, illustrating the schematic structure of a hologram laser 50. Here, the components that play the same or corresponding roles as in the hologram laser 30 as shown in FIG. 6 will be identified with the same reference numerals, and overlapping descriptions will be omitted. In the hologram laser 50, as an alternative to the polarizing hologram element 42 as shown in FIGS. 8A and 8B, the use of a polarizing prism 51 may be considered. In this case, instead of disposing the hologram 8 in the outgoing optical path, the polarizing prism 51 is mounted. Like the polarizing hologram element 42, the polarizing prism 51 also has the property of transmitting or reflecting laser light according to the polarization direction of the light. Thus, the use of the polarizing prism 51 makes it possible to create a polarization reflecting plane 52 having the property of transmitting laser light emitted from the semiconductor laser 35 and reflecting return light reflected from the optical disk. The return light reflected from the polarization reflecting plane is then directed through a mirror 53 to the hologram element 40, and the light diffracted by the hologram 8 is incident on the light receiving element 19.

Moreover, on the bottom surface of the hologram element 40 is formed a 3-beam-generating diffraction grating 41. The diffraction grating 41 is provided for use with the DPP method by which a tracking control signal is obtained through an operation of signals on the basis of three beams. By imparting polarization characteristics to the diffraction grating 41, the interference between the hologram element 40 and the 3-beam-generating diffraction grating 41 which may occur in the return optical path can be ignored, resulting in an advantage in increasing the design flexibility.

Since the hologram 8 is constituted in a grating form, the grating pitch is dependent on the diffraction angle. The smaller the pitch, the more difficult the grating formation. Thus, it is desirable to make the grating pitch as large as possible. Meanwhile, the larger the grating pitch, the smaller the diffraction angle. In this case, the light diffracted by the hologram 8 (signal light) inconveniently extends to the diffraction grating 41, which may cause disturbance in signals. In view of the foregoing, by using a polarization diffraction grating, it is possible to acquire a higher tolerance for the diffraction position or spread of the light reflected from the non-targeted information recording surface. Thus, even if the diffraction angle is decreased as the result of increasing the grating pitch, it never occurs that signals suffer from disturbance because of the diffraction grating being subjected to light, and consequently the signals can be read out properly. As a result, the hologram element 40 can be produced more easily, and besides, cost reduction can be achieved.

On the back surface of the hologram element 40 is formed the 3-beam-generating diffraction grating 41 to split laser light into three light beams. These three light beams are classified as a zeroth order light beam (central beam), and ± first-order light beams (side beams) On the basis of the side beams, a tracking signal is obtained. This is the so-called 3-beam method, and one of common methods for acquiring a tracking control signal required to read out information from a CD for obtaining signals with use of light having a wavelength of 780 nm. In the outer circular portion of the package, rotational adjustment is carried out, at the time when the hologram laser 50 is mounted in the optical pickup, to adjust the positions of the three beams with respect to the pit of the optical disk. That is, the three beams are so adjusted as to be located at optimum positions to obtain a tracking signal used in servo control which is exercised by means of the DPP method using three beams.

Further, in the diffraction grating 41 having a grating pattern, it is preferable to provide a crest/valley phase inversion region within the diffraction grating 41, that is, the diffraction grating 41 is preferably formed of a phase-shift diffraction grating. By doing so, in the case of adopting the DPP method for tracking servo control, tracking servo can be effected without performing rotational adjustment to the three beams. This is because, in the case of providing a phase inversion region in the diffraction grating 41, no push-pull signal is generated in the ± first-order light beams, namely, the sub beams, of the three beams. Thus, tracking servo can be effected without adjusting the difference in phase between the push-pull components of the main and sub beams. Examples of such a phase-shift diffraction grating include the one in which the phase inversion region is inverted in a direction perpendicular to the direction of the groove of the diffraction grating 41; and the one in which the phase is successively inverted obliquely relative to the groove direction.

Figure 10:
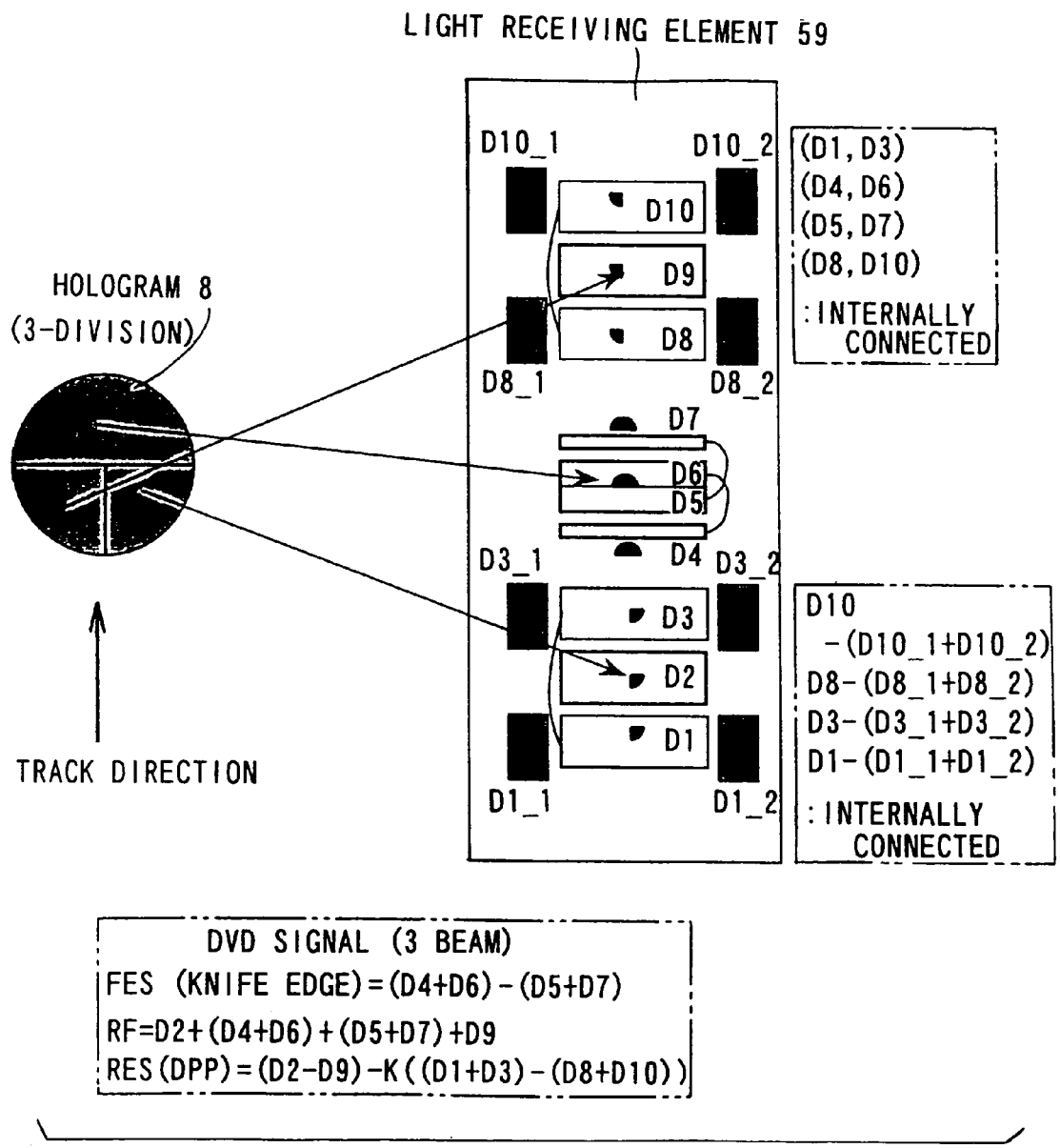
FIG. 10 is a view of a third embodiment of the invention, illustrating the arrangement of light receiving domains in a light receiving portion of a light receiving element with respect to the hologram.

FIG. 10 is a view of a third embodiment of the invention, illustrating the arrangement of light receiving domains in a light receiving portion of a light receiving element 59 with respect to the hologram 8. In the light receiving element 59, in addition to the auxiliary light receiving domains provided on both outer sides of each of the light receiving domains D3 and D8, auxiliary light receiving domains D1_1 and D1_2 are provided on both outer sides of the light receiving domain D1, and likewise, auxiliary light receiving domains D10_1 and D10_2 are provided on both outer sides of the light receiving domain D10. In this way, a DC offset-cancellation signal can be detected more effectively.

Figure 11:
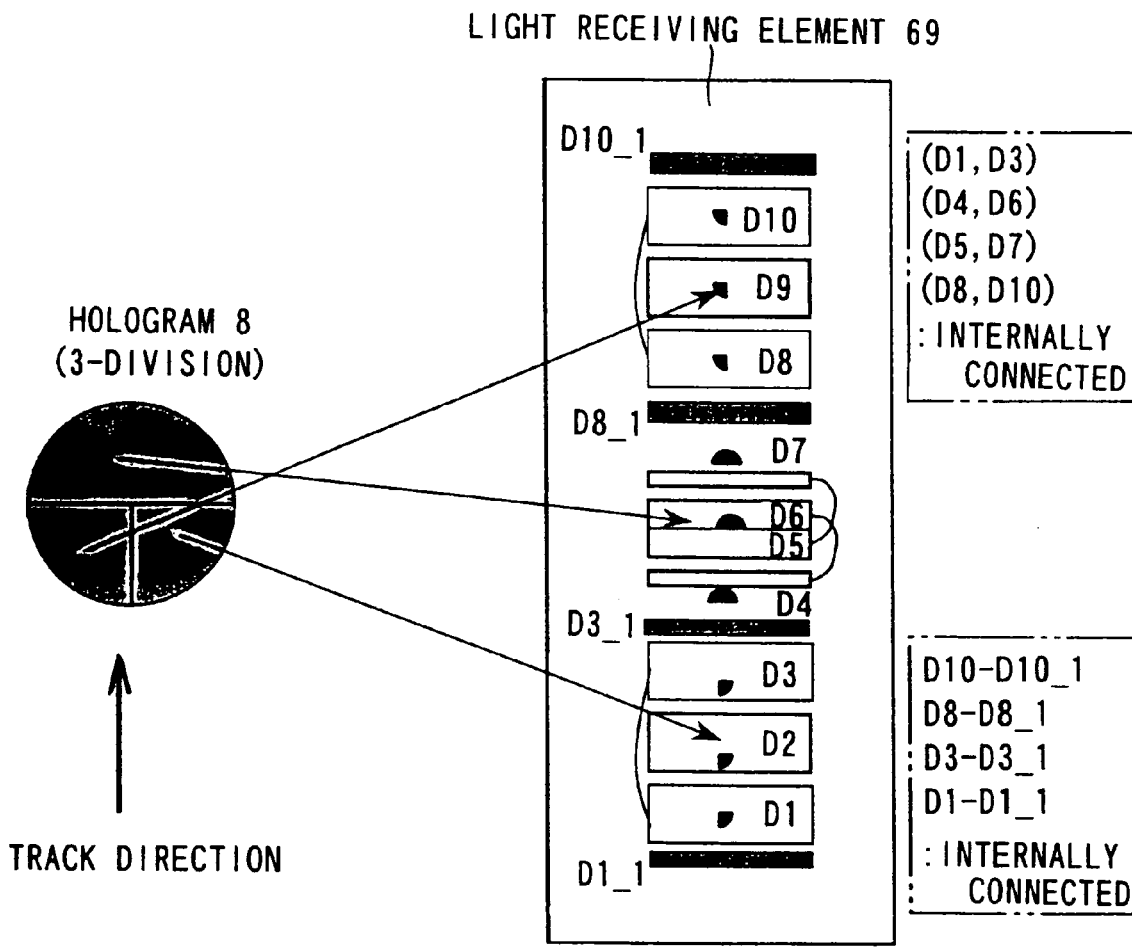
FIG. 11 is a view of a fourth embodiment of the invention, illustrating the arrangement of light receiving domains in a light receiving portion of a light receiving element with respect to the hologram.
Figure 13:
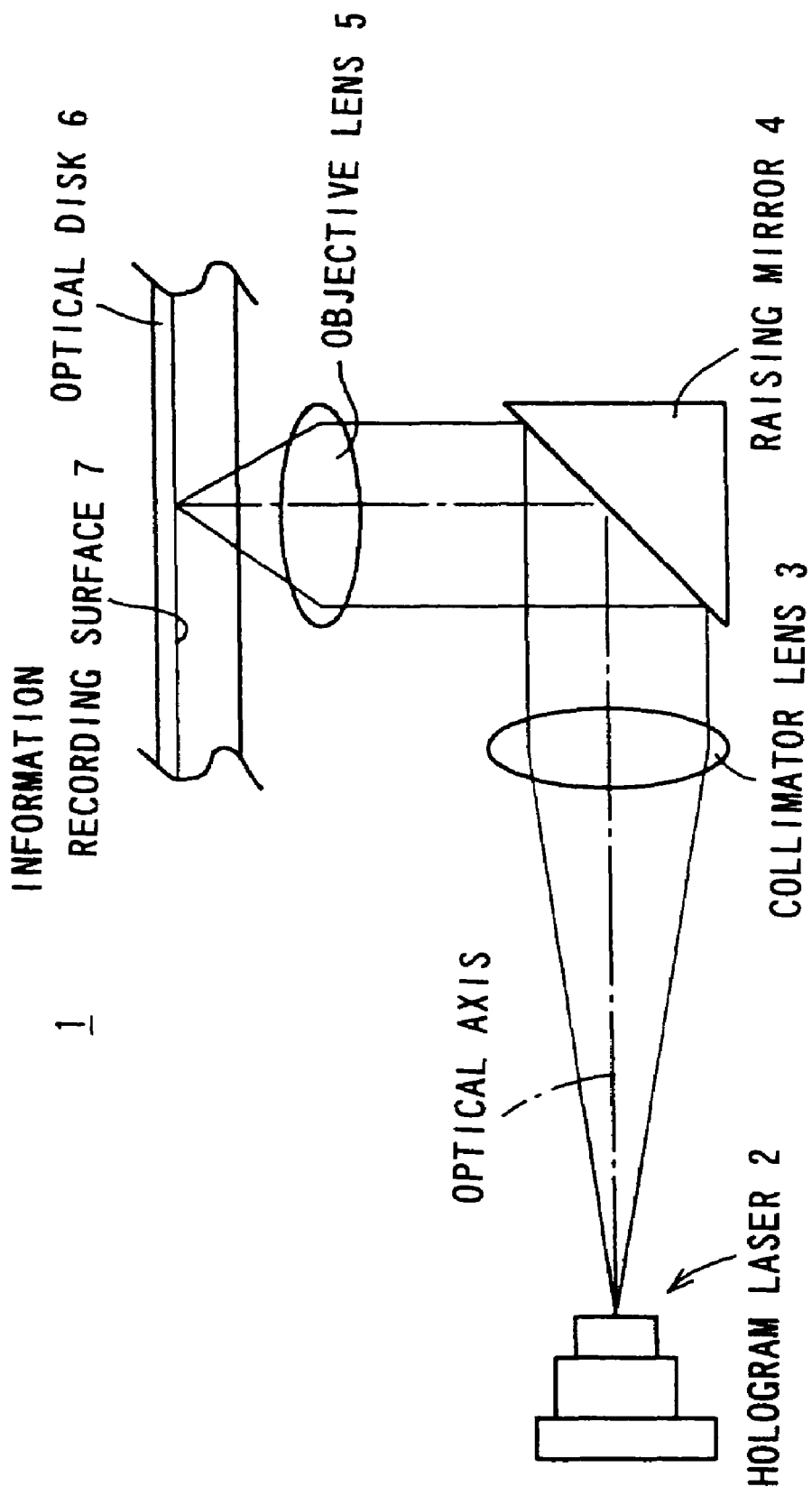
FIG. 13 is a sectional view schematically showing the structure of a standard optical pickup of conventional design.

FIG. 11 is a view of a fourth embodiment of the invention, illustrating the arrangement of light receiving domains in a light receiving portion of a light receiving element 69 with respect to the hologram 8. In this embodiment, with respect to the track direction, auxiliary light receiving domains are each provided on one outer side of the light receiving domain which receives a sub beam. As shown in FIGS. 3 and 5, since an image formed by the light returned from the non-targeted information recording surface spreads outwardly of the track direction, a DC offset-cancellation signal can be obtained in the auxiliary light receiving domain.

FIGS. 12A and 12B are views of a fifth embodiment of the invention, illustrating a case where the beam size method is adopted to obtain a focusing control signal. Note that, in the first to fourth embodiments, the knife-edge method can be adopted with which a focusing error signal FES is used. In the case of adopting the beam size method which is generally used for focusing servo control, since tracking control is carried out by means of the 3-beam method, as shown in FIG. 12A, a hologram element 70 is not divided. Alternatively, both of ± first-order diffracted light beams are used. The ± first-order diffracted light beams are generated when the light of signals reflected from the optical disk is incident on the hologram. Although, in the systems described thus far, ± first-order diffracted light beams are generated, only one of the + first-order diffracted light beam and − first-order diffracted light beam issued, to make the light receiving element smaller in area.

FIG. 12B shows a two-division hologram element 80 according to the embodiment. In the case of adopting the DPP method to exercise tracking control, the hologram is divided into two segments by a dividing line running in a direction parallel to the direction equivalent to the track direction. Then, auxiliary light receiving domains are provided at the positions adjacent to the light receiving domains S1, S6, S7, and S12, respectively, that receive sub beams. In this case, by obtaining a difference in signal between the domains S7_1 and S12_2, for example, it is possible to cancel a DC offset caused by the light reflected from the non-targeted information recording surface. Although, in the figure, the light reflected from the non-targeted information recording surface is illustrated as being present only on the left-hand side of the two-division hologram element 80 for simplicity's sake, the light returns to the right-hand side, too, as a matter of course. Moreover, it is needless to say that, also in this embodiment, by using a polarizing hologram, light can be exploited with a higher degree of efficiency.

Note that, although the above explanation deals with the case where the invention is applied to an optical pickup for performing reading operations on the basis of single-wavelength light, the invention is also applicable to an optical pickup for performing reading operations on the basis of light of different wavelengths. In this case, for example, laser light sources capable of emitting light of different wavelengths may be placed in a single package, or in different packages.

In the embodiment of the invention, the auxiliary light receiving domain may be further disposed adjacent to the light receiving domain on which the main beam is incident. According to such a constitution, an image formed by the main beam in a deviated position can be acquired reliably, thereby achieving cancellation of a DC offset.

In the embodiment of the invention, the auxiliary light receiving domain may be arranged in a direction which is approximately equivalent to the diffraction direction of the hologram with respect to the main light receiving domain on which the main beam is incident. According to such a constitution, this makes it possible to receive the return main beam without fail, and thereby achieve a reduction in DC offset.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. An optical pickup comprising:

a laser light source;

a diffraction grating for splitting laser light emitted from the light source into three light beams which are a main beam as a zeroth order diffracted light beam and two sub beams as ± first-order diffracted light beams;

an objective lens for converging laser light onto an information recording surface of an optical disk;

a hologram for deflecting return light which travels toward the laser light source after being reflected from the optical disk, by exploiting a diffraction effect; and a light receiving element for receiving the return light deflected by the hologram, wherein the hologram is formed of a polarizing hologram element in which a light component having one given polarization direction is substantially entirely transmitted without being diffracted, whereas another light component having the other polarization direction is diffracted as diffraction light, wherein the hologram is divided into first, second and third deflecting domains, each of which deflecting domains receives the main beam and the two sub beams reflected from the optical disk, the main beams deflected by the first, second and third deflecting domains traveling, in a direction equivalent to a track direction of the optical disk between the two sub beams deflected by a same deflecting domain, the main beam and the two sub beams deflected by the first deflecting domain traveling in the direction equivalent to the track direction of the optical disk between the main and sub beams deflected by the second deflecting domain and the main and sub beams deflected by the third deflecting domain, wherein a light receiving portion of the light receiving element is divided into a first light receiving domain group comprising three light receiving domains for receiving the main beam and the sub beams deflected by the first deflecting domain, a second light receiving domain group comprising three light receiving domains for receiving the main beam and the sub beams deflected by the second deflecting domain, and a third light receiving domain group comprising three light receiving domains for receiving the main beam and the sub beams deflected by the third deflecting domain, and wherein the second and third light receiving domain groups further comprise, respectively, auxiliary light receiving domains disposed adjacent to ends of a light receiving domain which receives the sub beam in a direction perpendicular to the direction equivalent to the track direction of the optical disk.

2. The optical pickup of claim 1, wherein the hologram is divided by a dividing line running in a direction which is perpendicular to a direction equivalent to a track direction of the optical disk.

3. The optical pickup of claim 1, wherein the auxiliary light receiving domain is arranged in a direction which is approximately equivalent to the diffraction direction of the hologram with respect to the main light receiving domain on which the main beam is incident.

4. The optical pickup of claim 3, wherein the auxiliary light receiving domain is arranged in front and behind the main light receiving domain in a direction which is approximately equivalent to the diffraction direction of the hologram with respect to the main light receiving domain.

5. The optical pickup of claim 1, wherein the auxiliary light receiving domains include:
one auxiliary light receiving domain disposed adjacent to the light receiving domain on which one of the sub beams of the ± first-order diffracted light beams is incident; and
another auxiliary light receiving domain disposed adjacent to the light receiving domain on which the other of the sub beams of the ± first-order diffracted light beams is incident.

6. The optical pickup of claim 1, wherein at least one of the auxiliary light receiving domains comprises a plurality of segments arranged in a direction which is approximately perpendicular to the diffraction direction of the hologram with respect to the main light receiving domain, and the segments are each so shaped as to elongate in a direction which is approximately perpendicular to the direction equivalent to the track direction of the optical disk.

7. The optical pickup of claim 1, wherein at least one of the auxiliary light receiving domains is further disposed adjacent to the light receiving domain on which the main beam is incident.

8. The optical pickup of claim 7, wherein at least one of the auxiliary light receiving domains is arranged in a direction which is approximately equivalent to the diffraction direction of the hologram with respect to the main light receiving domain on which the main beam is incident.

9. The optical pickup of claim 1, wherein the diffraction grating for splitting laser light emitted from the laser light source into three beams is formed of a phase-shift diffraction grating.

10. The optical pickup of claim 1, wherein the laser light source, the light receiving element, the diffraction grating, and the hologram are combined together to constitute a single unit of a hologram laser.

11. A hologram laser that is employed in the optical pickup of claim 1, comprising:
the laser light source;
the light receiving element;
the diffraction grating;
the hologram; and
a package,
wherein the laser light source and the light receiving element are housed in the package, and
the diffraction grating and the hologram are attached to a surface of the package.

12. The optical pickup of claim 1, wherein the hologram is formed as a single piece comprising a quarter-wavelength plate and the polarizing hologram element.

13. The optical pickup of claim 1, wherein diffraction grating is configured to vary a refractive index according to the polarization direction of laser light.

14. The optical pickup of claim 12, wherein the quarter-wavelength plate is configured to be adjusted optimally according to the polarization direction of laser light.

15. The optical pickup of claim 1, wherein the light receiving element comprises a signal processing mechanism for electronically computing a signal difference between the auxiliary light receiving domain and the main light receiving domain,
whereby the light that enters the main light receiving domain for reading out signals is canceled by using a result of the electronic computation; and
whereby a DC offset is reduced.

16. An optical pickup comprising:
a laser light source;
a diffraction grating for splitting laser light emitted from the light source into three light beams which are a main beam as a zeroth order diffracted light beam and two sub beams as ± first-order diffracted light beams;
an objective lens for converging laser light onto an information recording surface of an optical disk;
a hologram for deflecting return light which travels toward the laser light source after being reflected from the optical disk, by exploiting a diffraction effect;
a polarizing prism for creating a polarization reflecting plane that transmits laser light emitted from the laser light source and reflected return light reflected from the optical disk; and
a light receiving element for receiving the return light deflected by the hologram,
wherein the hologram comprises a polarizing hologram element in which a light component having one given polarization direction is substantially entirely transmitted without being diffracted, whereas another light component having the other polarization direction is diffracted as diffraction light,
wherein the hologram is divided into first, second and third deflecting domains, each of which deflecting domains receives the main beam and the two sub beams reflected from the optical disk, the main beams deflected by the first, second and third deflecting domains traveling, in a direction equivalent to a track direction of the optical disk between the two sub beams deflected by a same deflecting domain, the main beam and the two sub beams deflected by the first deflecting domain traveling in the direction equivalent to the track direction of the optical disk between the main and sub beams deflected by the second deflecting domain and the main and sub beams deflected by the third deflecting domain, wherein the polarizing prism is mounted on the hologram and arranged between the hologram and the objective lens, wherein a light receiving portion of the light receiving element is divided into a first light receiving domain group comprising three light receiving domains for receiving the main beam and the sub beams deflected by the first deflecting domain, a second light receiving domain group comprising three light receiving domains for receiving the main beam and the sub beams deflected by the second deflecting domain, and a third light receiving domain group comprising three light receiving domains for receiving the main beam and the sub beams deflected by the third deflecting domain, and wherein the second and third light receiving domain groups further comprise, respectively, auxiliary light receiving domains disposed adjacent to ends of a light receiving domain which receives the sub beam, in a direction perpendicular to the direction equivalent to the track direction of the optical disk.

* * * * *